United States Patent
Pearlstein et al.

(10) Patent No.: US 6,829,303 B1
(45) Date of Patent: Dec. 7, 2004

(54) METHODS AND APPARATUS FOR DECODING IMAGES USING DEDICATED HARDWARE CIRCUITRY AND A PROGRAMMABLE PROCESSOR

(75) Inventors: Larry Pearlstein, Newtown, PA (US); Sharif Mohammad Sazzad, Monmouth Junction, NJ (US)

(73) Assignee: Hitachi America, Ltd., Tarrytown, NY (US)

( * ) Notice: Subject to any disclaimer, the term of this patent is extended or adjusted under 35 U.S.C. 154(b) by 0 days.

(21) Appl. No.: 09/442,363

(22) Filed: Nov. 17, 1999

(51) Int. Cl.[7] .......................... H04N 7/12; H04N 11/02; H04N 11/04

(52) U.S. Cl. ............................. 375/240.25; 375/240.1; 375/240.01

(58) Field of Search ........................ 375/240.1, 240.01, 375/240.25, 240.17, 240.16

(56) References Cited

U.S. PATENT DOCUMENTS

| | | | |
|---|---|---|---|
| 5,614,952 A | | 3/1997 | Boyce et al. ............... 348/392 |
| 5,809,174 A | * | 9/1998 | Purcell et al. ............... 382/236 |
| 5,815,206 A | * | 9/1998 | Malladi et al. ......... 375/240.01 |
| 5,818,532 A | * | 10/1998 | Malladi et al. ......... 375/240.03 |
| 5,870,310 A | * | 2/1999 | Malladi ........................ 716/19 |
| 5,903,312 A | * | 5/1999 | Malladi et al. ......... 375/240.03 |
| 6,243,140 B1 | * | 6/2001 | Suzuki ........................ 348/448 |
| 6,320,908 B1 | * | 11/2001 | Ikekawa ................. 375/240.25 |
| 6,321,026 B1 | * | 11/2001 | Dierke ......................... 386/95 |
| 6,359,929 B1 | * | 3/2002 | Boon ..................... 375/240.16 |
| 6,389,076 B2 | * | 5/2002 | Bakhmutsky et al. .. 375/240.17 |
| 6,490,324 B1 | * | 12/2002 | McDade et al. ........ 375/240.25 |
| 6,526,095 B1 | * | 2/2003 | Nakaya et al. ......... 375/240.16 |

OTHER PUBLICATIONS

ATI Technologies Inc. Product Literature entitled: "Chip Technology—ATI RAGE 128 Pro Family—Mainstream 2D/3D Graphics and Multimedia Acceleration", pp. 1–2, 1999.

International Standards Organization—Moving Picture Experts Group, Recommendation H.222.0, ISO/IEC 13818–1 titled "Information Technology—Generic coding of Moving Pictures and Associated Audio: Systems", Nov. 13, 1994, pp. ii–130.

International Standards Organization—Moving Picture Experts Group, Recommendation ITU–T H.262, ISO/IEC 13818–2 titled "Information Technology—Generic Coding of Moving Pictures and Associated Audio Information: Video", Nov. 9, 1994, pp. i–222.

* cited by examiner

Primary Examiner—Chris Kelley
Assistant Examiner—Charles E Parsons
(74) Attorney, Agent, or Firm—Michael P. Straub; Straub & Pokotylo

(57) ABSTRACT

Video decoder methods and apparatus are described. In accordance with the invention, hardware decoder circuitry, e.g., intra-coded image decoding circuitry and motion vector reconstruction circuitry, is used in combination with a general purpose processor, e.g., Pentium processor, to perform video decoding operations. The video decoder hardware circuitry of the present invention is responsible for performing non-memory intensive functions. The general purpose processor or a general purpose processor operating in conjunction with a graphics processor are used to perform memory intensive video decoding operations such as motion compensated predictions. The video decoding hardware circuitry of the present invention can be implemented as a separate physical device, e.g., chip, or can be implemented on the same physical chip as a general purpose processor with which it works. By using the video decoding hardware circuitry of the present invention in combination with a CPU, a computer system's ability to perform video decoding operations can be significantly increased at little cost in terms of additional hardware.

1 Claim, 3 Drawing Sheets

METHODS AND APPARATUS FOR DECODING IMAGES USING DEDICATED HARDWARE CIRCUITRY AND A PROGRAMMABLE PROCESSOR

FIELD OF THE INVENTION

The present invention relates to decoding of images and, more specifically, to methods and apparatus for performing video decoding in a system including a programmable processor, e.g., a central processing unit (CPU).

BACKGROUND OF THE INVENTION

The digital represent ation of images is becoming ever more common. Digital video, e.g., digital high definition television (HDTV), represents one application where digital video signals comprise, e.g., a sequence of digital images. With the increasing use of the Internet, the generation, storage and transmission of digital video images is likely to continue to increase.

In order to reduce the amount of data required to represent digital images, such images are often encoded, e.g., compressed. Coding of images in the form of frames may be performed on an intra-frame basis so that the generated encoded image data does not depend on data from other images. Intra-frame coding is often performed using discrete cosine transform (DCT) coding techniques. Data generated from intra-frame coding is often called intra-coded data.

When a sequence of images is being coded, coding of images may be performed on an inter-frame, as well as an intra-frame, basis. Inter-frame coding generally involves using motion compensated prediction techniques to produce motion vectors which include information on how a portion of a subsequent image may be generated using a portion of a preceding or subsequent image as reference data. Motion vector information, once generated, may be coded, e.g., using differential coding techniques, to reduce the amount of data required to represent the motion vector information.

When there is little motion between frames, motion vectors provide an efficient method of representing portions of image. However, intra-frame coding can be more efficient when there is a substantial change from one frame to another. In an attempt to maximize coding efficiency, often some portions of an inter-coded frame are encoded using intra-frame coding techniques while other portions of the same image are coded using inter-frame coding, e.g., motion vectors. Those portions of inter-coded frames that use inter-frame coding, may also include coded information regarding the residual, or correction, image. During decoding of such portions of frames, the coded residual data is decoded. The decoded residual image data is combined with image data generated by performing motion compensated predictions using reference frame data and motion vectors. Those portions of inter-coded frames that use intra-frame coding are decoded without the use of reference frame data or motion vectors. In this manner, a complete inter-coded frame can be generated from the intra- and inter-coded data used to represent the frame.

MPEG-2 is a well known video standard which includes support for the use of motion compensated prediction techniques in addition to transform coding, e.g., the use of DCT transforms. The international video standard MPEG-2 is described in the International Standards Organization document (ISO/IEC 13818-2). MPEG2 has been used as the basis for several commercial applications including digital video disks (DVD) and digital broadcast television.

In MPEG-2 motion vector information is differentially encoded for transmission purposes. In addition, quantization operations and run length coding operations are performed on video data to further reduce the amount of data required to represent the images being encoded. A scan conversion operation is also normally performed as part of the MPEG-2 coding process in order to convert a set of two dimensional coefficient data into a one dimensional data sequence which can be processed, stored and/or transmitted. Variable length coding is applied to many of the data elements in order to further reduce the number of bits needed to represent an image.

In order to view images represented using encoded video data, the image data has to be decoded prior to display. MPEG-2 decoding generally involves performing operations which are the inverse to those used to originally encoded the image data, e.g., decoding usually involves variable length decoding, inverse scan conversion, inverse quantization, inverse discrete cosine transform (IDCT), motion vector reconstruction and motion compensated prediction operations.

Given the large amount of data used to represent images, a considerable amount of processing is normally required to decode an encoded image. In the case of motion vectors, image decoding is complicated by the need to access reference frame data, e.g., previously decoded frames, in order to generate a current decoded frame. The need to access reference frame data to perform motion compensated predictions using motion vector information results in the motion compensated prediction operations being highly memory intensive. The large number of memory access operations associated with performing motion compensated predictions can often have a significant impact on the amount of resources required to decode an image.

Users of computers are beginning to expect that they will be able to decode and display video images, e.g., encoded motion pictures, in real time. In order to achieve the real time display of encoded video, the encoded video images, e.g., frames, on average, need to be decoded in the same or a smaller amount of time than is used to display the images. As discussed above, the amount of processing required to decode an image can be considerable. Placing real time restraints on decoder circuitry further complicates matters due to the time constraints in which the decoding must be accomplished.

Generally, known video decoders belong to one of three types: 1) those that use dedicated special purpose integrated decoder circuits coupled with video memory to fully decode encoded video data; 2) those that use software and a general purpose programmable processor, e.g., CPU such as a Pentium processor, to fully decode encoded video data; and 3) those that partition the video decoding between a general purpose programmable processing unit such as a Pentium processor and a graphics processor chip which is used to manage and/or perform memory intensive operations such as motion compensated prediction. A high speed video or graphics memory is often used in conjunction with the graphic's processor to further accelerate image decoding operations.

In many high definition television sets and other video display devices, the first type of known decoders are used. That is, dedicated hardware decoder circuits are used to decode received encoded video data. FIG. 1 illustrates a known decoder circuit 100 capable of decoding MPEG-2 video signals.

As illustrated, the video decoder 100 comprises a variable length decoder (VLD) circuit 102, an inverse scan circuit 104, an inverse quantization circuit 106, an inverse discrete cosine transform (IDCT) circuit 108, a motion compensated prediction circuit 110, and a frame store memory 112. Motion vector reconstruction circuitry, which is used to reconstruct motion vectors from encoded motion vector information, is present but not explicitly shown in the FIG. 1 illustration.

In the known system, the VLD circuit 102 receives MPEG-2 encoded video data and performs a variable length decoding operation on variable length encoded data included therein. The inverse scan circuit 104 is responsible for re-sequencing elements of the video data output by the VLD circuit 102 to reverse the effect of the scan conversion operation originally used to convert the two dimensional coefficient data into a one dimensional ordering. The inverse quantization (IQUANT) circuit 106 performs an inverse quantization operation on the quantized values included in the video data output by the inverse scan circuit 104. The IQUANT circuit 106 generates a video data stream including DCT coefficients. The DCT coefficients are processed by the IDCT circuit 108 to generate decoded image date from received intra-coded image data. The output of the IDCT circuit, in the case of intra-coded data, is decoded video, e.g., pixel values which are used to control the light output of individual pixels.

As discussed above inter-coded images may include both intra and inter coded image portions. The motion compensated prediction circuit is responsible for using previously decoded image data, which has been stored in the frame store memory 102, as reference frame data. The motion compensated prediction circuit 110 outputs received decoded image data corresponding to intra-coded frames as well as decoded image data corresponding to inter-coded frames which it generates from received motion vectors and/or by combining decoded inter-coded image data with decoded image data.

In the case of personal computers, the computer already includes a general purpose processor which is capable of being used for video decoding operations. Accordingly, existing personal computers usually use the second or third of the known video decoding techniques discussed above.

Unfortunately, software decoder implementations tend to be far slower than hardware implementations operating at comparable clock speeds. This is because the CPU circuitry is not optimized for video decoding as is the case with a dedicated hardware circuit. In addition, the relatively large amount of data which must be transferred from memory when performing motion compensated prediction operations tends to create a bottleneck with regard to decoding speed.

While the use of a graphics processor and a dedicated video memory can help improve video decoding performance, the use of a general purpose CPU to perform non-memory intensive decoder operations still normally results in a slower decoder implementation than would be achieved using dedicated decoder hardware operating at comparable clock speeds.

Given the processing capability of CPU's currently used in common personal computers, and the increasing tendency to run multiple applications at the same time, real time software based video decoding of HDTV and other high resolution video images is often impractical on modern personal computers.

In view of the above, it becomes apparent that there is a need for improved methods and apparatus for decoding video images in systems, e.g., personal computers, which include programmable CPUs. It is desirable that at least some of the new methods and/or apparatus be capable of being implemented at a lower cost than providing a complete dedicated video decoder circuit capable of decoding intra-coded and inter-coded image data. It is also desirable that at some of the new methods and apparatus be capable of being used with systems which include a graphics processor for performing and/or overseeing memory intensive decoding functions such as motion compensated prediction operations.

SUMMARY OF THE INVENTION

The present invention is directed to methods and apparatus for decoding images. In accordance with the present invention video decoder circuitry is combined with a programmable processor, e.g., a general purpose CPU, to perform video decoding operations. A graphics processor may be used in combination with the CPU and video decoder circuitry of the present invention to perform and/or oversee memory intensive video decoder operations.

The video decoder circuitry of the present invention performs one or more non-memory intensive video decoding operations such as syntax parsing, variable length decoding, DC DCT coefficient reconstruction, motion vector reconstruction, inverse scan operations, inverse quantization and/or mismatch control. Memory intensive video decoding operations such as performing prediction operations using motion vectors and reference frames are performed by the programmable processor and/or graphics processor operating in conjunction with the video decoding hardware of the present invention. Because the functions performed by the video decoder circuitry of the present invention are normally performed at the beginning portions of the inter-coded decoding process, e.g., prior to performing motion compensated predictions, the video decoder circuitry of the present invention may be characterized as a video decoder front end processor. In various embodiments, the video decoder front end processor includes a complete intra-coded decoder. In addition it may, and in various embodiments does, include a motion vector reconstruction circuit.

The decoder circuitry of the present invention does not perform memory intensive motion compensated predictions. Accordingly, it can be implemented far more cheaply than video decoder circuits which perform such operations.

By combining the relatively low cost video decoder circuitry of the present invention with a general purpose processor, superior decoded video quality can be achieved and/or more images decoded in a given amount of time than when a similar general purpose processor is used to decode images without the benefit of the decoder circuitry of the present invention. Thus, the methods and apparatus of the present invention provide a way of enhancing a computer system's ability to decode video images at a fraction of the cost of adding a hardware decoder capable of fully decoding inter-coded images.

The video decoder circuitry of the present invention can be implemented on a separate chip from the computer system's CPU. Such a chip can be incorporated into a computer card which can be inserted into a computer to enhance the system's ability to perform video decoding. Alternatively, the video decoder circuitry of the present invention can be incorporated directly into a processor thereby providing the video decoder circuitry of the present invention and a programmable processor on a single semiconductor chip.

Various additional features and advantages of the present invention will be apparent from the detailed description which follows.

DETAILED DESCRIPTION

As discussed above, the present invention is directed to methods and apparatus for decoding images, e.g., MPEG-2 video images. The methods and apparatus of the present invention are well suited for use with systems which include a programmable processor, e.g., a computer system which includes a CPU. They are also well suited for use in systems which include, in addition to a CPU, a graphics processor for performing or overseeing memory intensive video decoding operations.

In contrast to prior art techniques which used a general purpose processor to perform non-memory intensive video decoding operations, the inventors of the present application realized that there can be processing speed and quality advantages to performing non-memory intensive video decoding operations in hardware. It was further recognized that a hardware circuit to perform such decoder operations could be implemented at relatively little cost and could be used in conjunction with a general purpose processor, or incorporated into a general purpose processor, to facilitate video decoding operations.

By using dedicated video decoder hardware circuitry to perform some, most, or all of the non-memory intensive operations associated with decoding one or more images, the ability of a computer system to decode still images and video is enhanced at a fraction of the price of providing a full hardware video decoder circuit capable of decoding inter-coded and intra-coded images.

Figure 1:
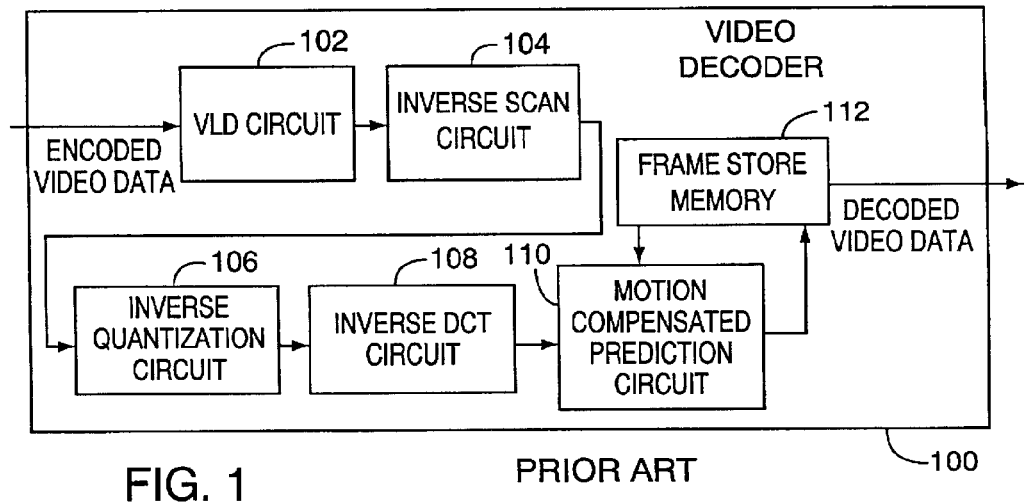
FIG. 1 illustrates a known MPEG-2 video decoder.
Figure 2:
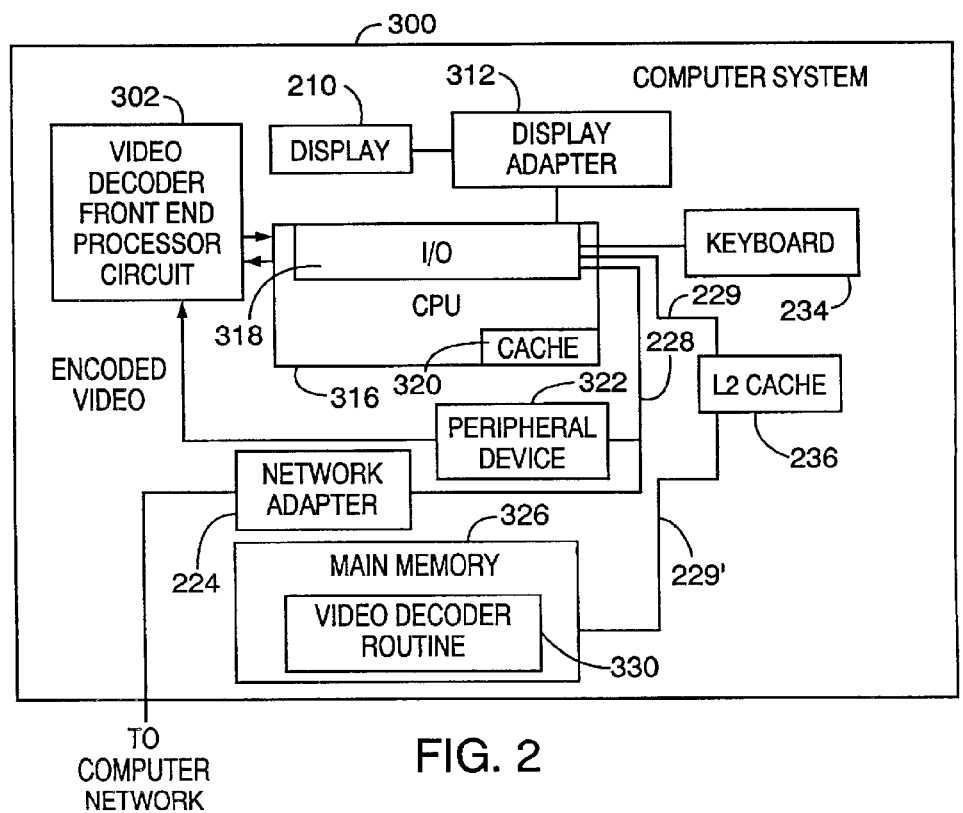
FIGS. 2 and 3 illustrate exemplary computer systems of the present invention wherein a video front end processor is used in combination with a CPU and software to decode encoded video.

FIG. 2 illustrates a computer system 300 implemented in accordance with one embodiment of the present invention. As illustrated the system 300 includes a video decoder front end processor circuit 302 used for performing non-memory intensive video decoding operations in accordance with the present invention, a programmable processor (CPU) 316, a display device 210, display adapter 312, keyboard 234, a first memory bus 229, a second memory bus 229', and a system bus 228.

The system 300 further includes a secondary (L2) cache 236 which is coupled to the CPU 316 via the first memory bus 229 and to the main memory 326 via the second memory bus 229'. The system bus 228 couples a network adapter 224 and a peripheral device 322 to one another and to the CPU 316. The network adapter 224 is used to couple the system 300 to a digital network via which encoded video data may be received.

The peripheral device 322 is coupled to the video front end processor circuit 302 in addition to being coupled to the system bus 228. In this manner, the peripheral device 322 which may be, e.g., a video disc player, can supply encoded video directly to the video front end processor circuit 302. While a single peripheral device 322 is shown in the system 300 it is to be understood that the system can, and in various embodiments does, include multiple peripheral devices 322.

In the system 300, the CPU 316 includes a cache 320 and an I/O interface 318. The I/O interface 318 couples the CPU 316 to the video front end processor circuit 302, display adapter 312, keyboard 234, system bus 228 and memory bus 229. The I/O interface 318 serves to electrically connect the devices coupled thereto and to convert between internal signaling formats used by the CPU 316 and external devices coupled thereto. The CPU 316 performs processing operations under control of routines stored in the main memory 326. The stored routines include a video decoder routine 330 and various other routines, e.g., spread sheet, word processor, web browser, etc. As will be discussed below, unlike the prior art video decoder routines which were responsible for controlling a CPU to fully decode inter-coded video data, the video decoder routine 330 of the present invention is designed to control the CPU so that it interacts with the video decoder front end processor circuit 302 in such a manner as to produce fully decoded video data. Thus, under control of the routine 330 the CPU 316 performs video decoding operations not performed by the video processor circuit 302, e.g., motion compensated prediction operations.

In the FIG. 2 embodiment, a display adapter 312 is used to couple the CPU 316 to the display device 210. The display adapter 312 converts video signals output from the CPU 316 into a format used by the display device 210. The signals, e.g., video images, output by the display adapter are displayed on the display device 210.

Operation of the video processor circuit 302 will be described in detail below with regard to FIG. 4. However, generally speaking, the video processor circuit 302 receives configuration and other set-up information from the CPU 316 and processes encoded video received from the peripheral device 322 or CPU. The performed processing includes, e.g., syntax parsing, variable length decoding, and/or other non-memory intensive video decoding operations. The video data, e.g., decoded intra-coded image data and/or partially decoded inter-coded image data, generated by video processor circuit 302, is passed to the CPU 316. In the FIG. 2 embodiment, the CPU 316 is responsible for completing the image decoding process to the extent that additional decoding operations are required. For example, in the case of inter-coded image data, the CPU 316 under control of the video decoder routine 330 performs motion compensated predictions using reconstructed motion vector information received from the video processor circuit 302. As will be discussed below, in various embodiments, the video front end processor circuit 302 is capable of fully decoding intra-coded image data. Accordingly, in the case of intra-coded frames, the CPU 316 need not decode the image data output by the video front end processor circuit 302. However, when processing video data including both intra-coded and inter-coded frames, the previously decoded frame data output by the processor circuit 302 is normally stored on a temporary basis. The temporary storage of decoded image data allows for frame re-sequencing and renders the image data available in the event that it is needed as reference frame data in performing a motion compensated prediction operation.

Figure 3:
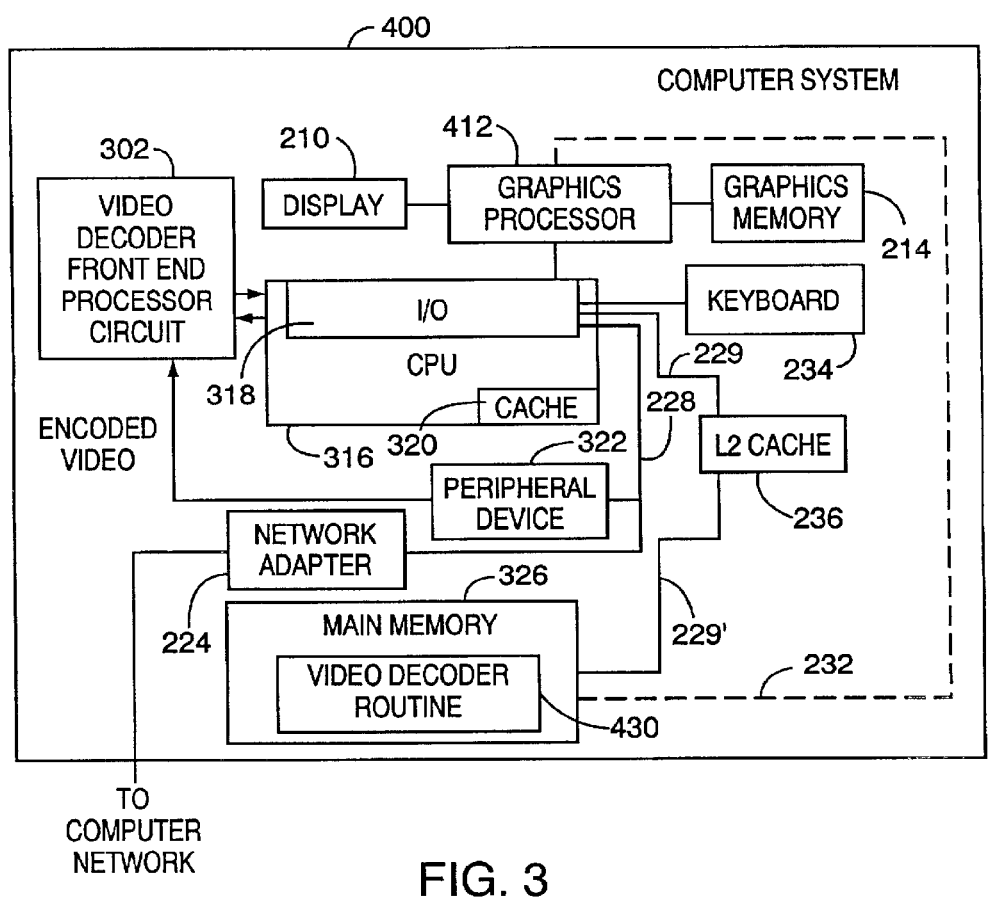

FIG. 3 illustrates another exemplary embodiment of the present invention. The circuitry 400 illustrated in the FIG. 3 embodiment is similar to that of the FIG. 2 embodiment. However the display adapter 312 is replaced with a graphics processor 412 capable of performing and/or overseeing memory intensive video decoder operations. In addition, in the FIG. 3 embodiment a graphics memory 214 and a video bus 232 are included to facilitate performing memory intensive video operations such as motion compensated prediction. The graphics memory 214 is used for storing reference frame data used for motion compensated predictions while the video bus 232 is used for exchanging information between the main memory and video memory at a high rate of speed and without interfering with communications over the system bus 228.

Figure 4:
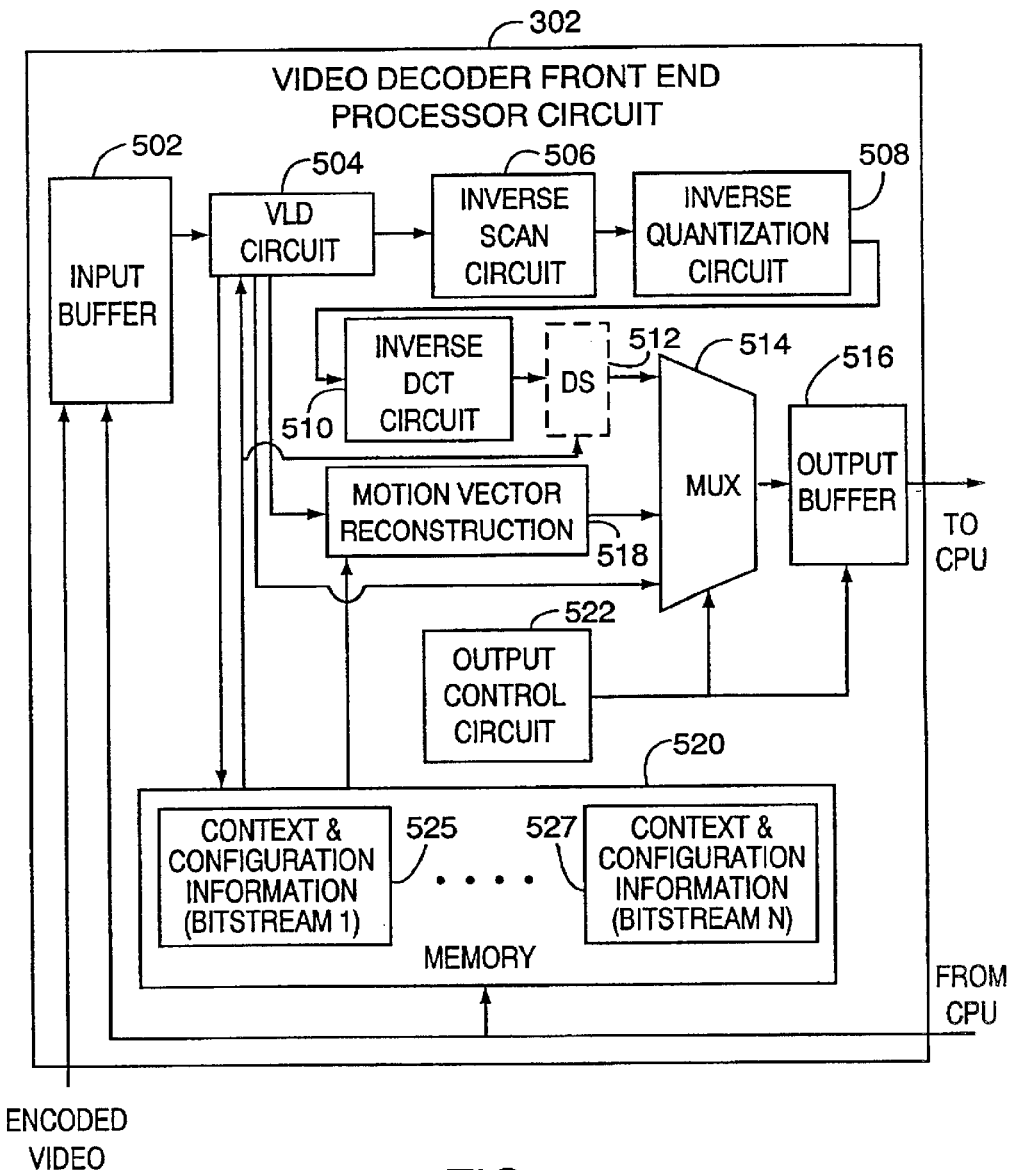
FIG. 4 illustrates the front end processor of the present invention, used in the FIGS. 2 and 3 embodiments, in greater detail.

FIG. 4 illustrates a video decoder front end processor circuit 302 which may be used in the systems illustrated in FIGS. 2 and 3. As illustrated, the processor circuit 302 includes an input buffer 502, a VLD circuit 504, memory 520, an inverse scan circuit 506, inverse quantization circuit 508, inverse DCT circuit 510, an optional downsampler 512, a motion vector reconstruction circuit 518, a MUX 514, an output buffer 516, and an output control circuit 522.

While the circuit 302 includes memory 520, it is a relatively small amount of memory compared to the graphics memory 214 or main memory 326. This is because the memory 520 is used for storing control, configuration and, context information relevant to decoding operations as opposed to the actual frames. One kilobyte is an exemplary size of the memory 520 in the case of 8 bits per byte. The memory 520 includes a set of context, control, and configuration information 525, 527 for each of N bitstreams which are processed by the circuit 302. In addition to, or as part of, the memory 520, video buffers, e.g., processing buffers, may be included on the video decoder front end processor circuit 302.

The input buffer 502 is used to temporarily store video data and other input received by the video circuit 302 until the VLD circuit 504 is ready to process the input. The input can include encoded video data, configuration, and/or video bitstream information received from the peripheral device 322 and/or CPU 316. The encoded video data may be, e.g., an MPEG-2 packetized elementary stream (PES) or a video elementary stream which is produced by depacketizing a PES stream. Thus, the encoded video data input to the video circuit 302 may include, for example, coded motion vectors, coded quantized blocks of DCT coefficients, macroblock type information and other ancillary data such as coded block pattern information, coded macroblock position information, field select signals, and motion type information. Received configuration information may include, e.g., a reset signal, down sampling mode control information in the case of a system which supports downsampling, data output format (e.g., 8 or 9 bit output format information), and/or image region information indicating for example, whether a border region or a center region of a letterbox image is being sent to the circuit 302 for processing.

The VLD circuit 504 receives the input to the circuit 302 from the input buffer 502. The VLD circuit 504 is responsible for performing a variable length decoding operation on received variable length encoded data. The VLD circuit 504 also identifies ancillary data. In addition, it identifies configuration, control, and video context information. Ancillary data and context information are supplied from the VLD circuit 504 to a third input of MUX 514. The configuration, control and video context information are also passed to the memory 520 and to the output control circuit 522.

Configuration, context, and/or control information can also be passed directly from the CPU 316 to the memory 520 thereby avoiding the need to transmit the information with the encoded video data being sent to the VLD circuit 504.

The memory 520 stores and outputs context information for each bitstream being decoded. The context information stored for each bitstream includes, e.g., high level syntax picture level and sequence level information. Exemplary stored picture level information includes frame type information (I, P, B frame information) while exemplary stored sequence level information includes vertical size, horizontal size, and frame rate. The video circuit 302 can be used to support decoding of multiple bitstreams, e.g., in order to support picture-in-picture capabilities. By storing context, control and configuration information 525, 527 for each of the multiple bitstreams being decoded the data need not be transmitted multiple times to the circuit 302. Each time a different bitstream is to be decoded, for which information is already stored in the memory 520, stored information associated with the bitstream to be decoded is supplied to the VLD circuit 504, motion vector reconstruction circuits 518 and downsampling circuit 512. In this manner, the video circuit 302 can be reconfigured to processes a different bitstream in a fast and efficient manner. For example, in response to the stored control information when processing image data intended to be used as a main picture, the downsampling circuit 512 may be disabled. However, in response to stored control information when processing inset picture data the downsampling circuit 512 may be enabled. Thus, data reduction operation may be performed on inset picture data but not main picture data in response to control information received from the memory 520.

The memory 520 also supplies the control information associated with a bitstream being processed to the output control circuit 522. The output control circuit 522 is coupled to a control input of the MUX 514 and a control input of the output buffer 516. The output control circuit 522 controls which data, e.g., decoded image data, motion vectors, ancillary data, etc. are output. The circuit 522 also controls when the information is output from the video circuit 302. The output control circuit 522 does this by controlling the MUX 514 and output buffer 516.

The VLD circuit 504 outputs image data generated by performing a variable length decoding operation. The image data output by the VLD circuit 504 is supplied to the inverse scan circuit 506 which performs the inverse of the scan conversion process performed at encoding time. Next, the video data is processed by the inverse quantization circuit 508 and then the inverse DCT circuit 510. The inverse quantization circuit performs an inverse quantization operation on received data while the inverse DCT circuit performs an inverse discrete cosine transform operation on received data. The decoded image data output by the IDCT circuit 510 is supplied to the downsampling circuit 512. Downsampling is performed in cases where the received control and/or configuration information indicates that it should be applied. For example downsampling may be applied to inset picture data and/or HDTV images when the images will be displayed at lower than their full resolution. The resulting decoded image data, corresponding to intra-coded frames prediction residuals, is supplied from the downsampler 512 to a first input of the MUX 514.

The VLD circuit 504 outputs motion vector information including, e.g., motion vector values encoded using differential encoding, to the motion vector reconstruction circuit 518. The reconstruction circuit 518 reconstructs motion vectors from the received information, e.g., by performing a reverse differential coding operation. The reconstructed motion vectors are supplied to a second input of the MUX 514.

As discussed above, the output control circuit 522 control the MUX 514. In response to the control signal from the control circuit 522, the MUX 514 outputs the data from one of its inputs. This information is stored in the output buffer 516 prior to being transmitted to the CPU 316 at a rate controlled by the output control circuit 522. Thus, video processor circuit 302 supplies the CPU 316 with decoded image data, e.g., pixel values, corresponding to intra-coded frames and intra-coded image portions. With regard to inter-coded image portions it supplies, e.g., reconstructed motion vectors, coded block pattern information or pattern code information, macroblock position information and/or pixel residual values used in performing motion compensated predictions. In cases where the video processor circuit 302 does not perform an IDCT operation, it may also output to the CPU 316 DCT coefficients.

The CPU 316 or CPU 316 operating in conjunction with a graphics processor 412 completes the decoding of inter-coded images using the video data supplied thereto from the video decoder front end processor circuit 302 of the present invention.

In the above described manner, the video front end processor circuit 302 of the present invention can be used to enhance and/or increase the speed at which a system including a programmable processor can perform video decoding operations.

While the video decoder front end processor circuit 302 of the present invention has been described as performing several operations, it is to be understood that one or only a few of the described operations may be performed by a video front end processor with the remaining operations being performed by a programmable CPU or a programmable CPU operating in combination with a graphics processor. The decoder front end processor may reside on a graphics processor board or on a separate printed circuit board, e.g., a computer plug in board.

Numerous additional embodiments, within the scope of the present invention, will be apparent to those of ordinary skill in the art in view of the above description and the claims which follow.

What is claimed is:

1. A method of decoding encoded image data comprising the steps of:

operating a decoder circuit implemented in hardware to perform at least one non-memory intensive image decoding operation to generate, from the encoded image data, a first set of processed image data, the at least one non-memory intensive image decoding operation being a variable length decoding operation;

supplying the first set of processed image data generated by the decoder circuit to a programmable processor; and operating the programmable processor to perform at least one additional image decoding operation using the first set of processed image data;

wherein the step of operating the decoder circuit, includes the step of performing at least two additional operations from the group of operations consisting of an inverse scan conversion operation, an inverse quantization operation, an inverse discrete cosine transform operation, and a data reduction operation, the two additional operations being different from said at least one non-memory intensive operation;

wherein the programmable processor is coupled to a graphics processor, the method further comprising the steps of:

operating the graphics processor to perform a motion compensated prediction operation using data included in the first set of processed data; and storing in the decoder circuit multiple sets of context information for different video streams at the same time, each set of stored context information corresponding to a different one of a plurality of encoded video data streams processed by the decoder circuit each set of context information including vertical size, horizontal size and frame rate information.

* * * * *